S. HUSON.
Grain and Straw Separator.
No. 36,467. Patented Sept. 16, 1862.
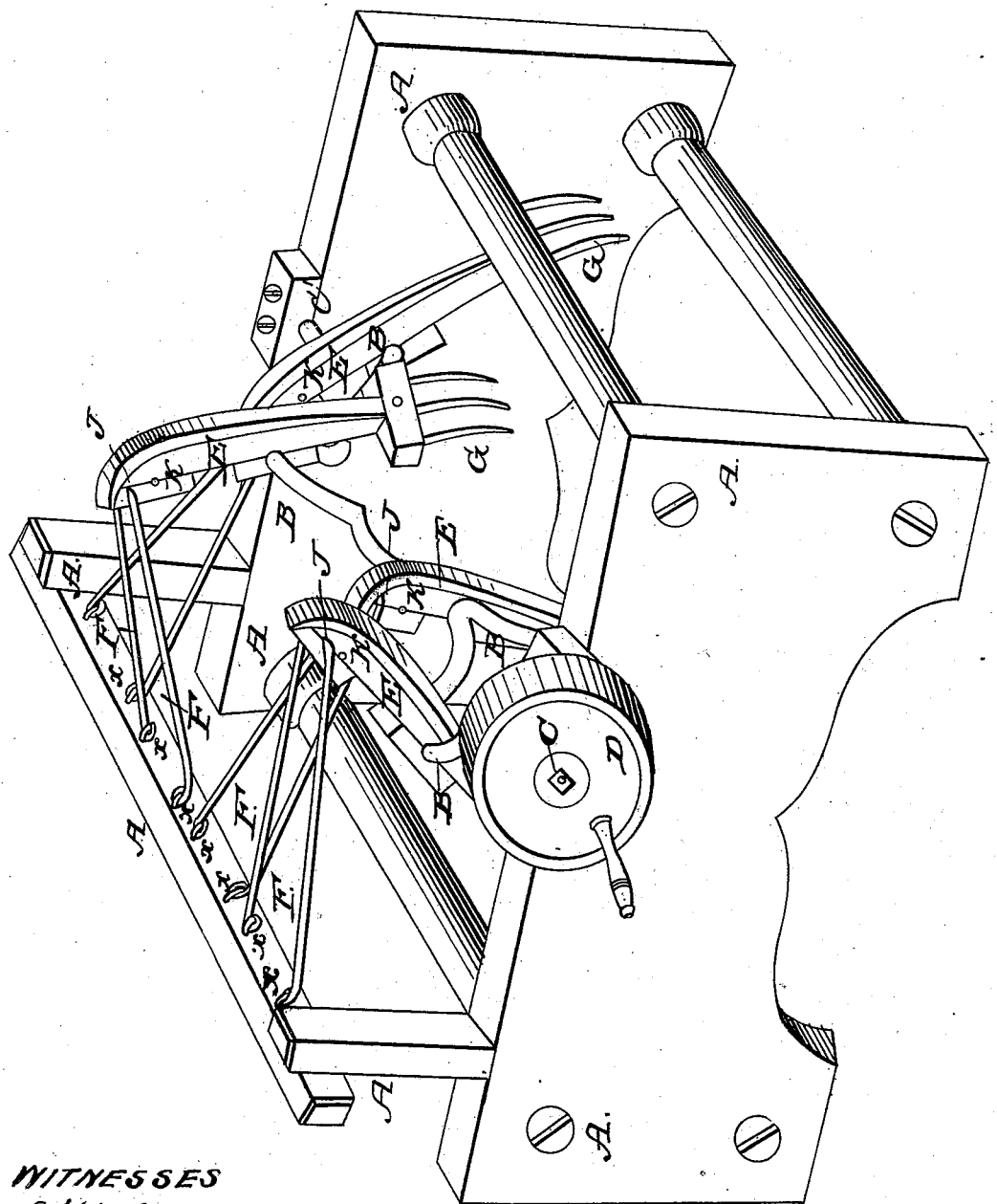
WITNESSES
C. K. Jeter
W. H. Lyon
INVENTOR
Samuel Huson

UNITED STATES PATENT OFFICE.

SAMUEL HUSON, OF JACKSONVILLE, NEW YORK.

IMPROVEMENT IN GRAIN AND STRAW SEPARATORS.

Specification forming part of Letters Patent No. 36,467, dated September 16, 1862.

*To all whom it may concern:*

Be it known that I, SAMUEL HUSON, of Jacksonville, in the county of Tompkins and State of New York, have invented a new and useful Improvement in Grain and Straw Separators; and I do hereby declare that the following is a full, clear, and exact description of the construction and operation of the same, reference being had to the annexed drawings, making a part of this specification, in which—

A, Figure 1, is the frame supporting the bearings C of the cranks B, which receive motion from the pulley D. To these cranks are attached the picker-arms E at or near their centers, and the upper ends of said arms are fastened to the rods F. When the cranks are in motion, the upper ends of the picker-arms move in a perpendicular arc, while the pickers G move in a horizontal ellipsis, thereby effectually agitating the straw or stalks of seed or grain, after the same have passed through the thrashing-cylinder and been brought by the carrier under said pickers and in contact with them.

The movement of the picker G may be increased by shifting the rods F from J to K, and the plane of the ellipsis, in which the pickers move, may be varied by shifting the cross-bar A up or down, to which cross-bar are attached the rods F and jointed thereto by means of the staples X or other convenient fastenings.

Having thus fully described my invention, I will proceed to state what I claim and desire to secure by Letters Patent—I claim:

Attaching the upper ends of the vertical arms E of a grain and straw separator to the rods F and their centers to the cranks B for the purpose of transmitting to the pickers G a horizontal-elliptical movement, in the manner and for the purpose described.

SAMUEL HUSON.

Witnesses:
C. H. HOWE,
C. K. TETER.